(12) United States Patent
DeAngelo

(10) Patent No.: US 10,634,849 B1
(45) Date of Patent: Apr. 28, 2020

(54) RUGGEDIZED TWO-AXIS OPTICAL BEAM STEERING DEVICE

(71) Applicant: Rosemount Aerospace Inc., Burnsville, MN (US)

(72) Inventor: Tim DeAngelo, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/361,841

(22) Filed: Mar. 22, 2019

(51) Int. Cl.
*G02B 6/35* (2006.01)

(52) U.S. Cl.
CPC ........... *G02B 6/351* (2013.01); *G02B 6/3582* (2013.01); *G02B 6/3598* (2013.01)

(58) Field of Classification Search
CPC ..... G02B 6/351; G02B 6/3582; G02B 6/3598
See application file for complete search history.

(56) References Cited

U.S. PATENT DOCUMENTS

| | | | | |
|---|---|---|---|---|
| 3,477,297 A | * | 11/1969 | Howe | G01C 19/26 74/5.1 |
| 4,060,314 A | * | 11/1977 | Heinz | G02B 7/1821 248/487 |
| 4,123,134 A | | 10/1978 | Meyers | |
| 4,655,548 A | * | 4/1987 | Jue | G02B 7/005 348/143 |
| 5,220,459 A | * | 6/1993 | Ichikawa | G11B 7/0932 359/811 |
| 5,424,872 A | | 6/1995 | Lecuyer et al. | |
| 6,992,843 B2 | | 1/2006 | Juhala | |
| 8,305,680 B2 | * | 11/2012 | Martinez | G02B 7/00 359/326 |
| 8,654,427 B1 | | 2/2014 | DeAngelo | |
| 9,482,928 B2 | * | 11/2016 | Perkins | G02F 1/353 |
| 9,874,308 B2 | * | 1/2018 | Saika | H04N 5/2328 |

* cited by examiner

*Primary Examiner* — Daniel Petkovsek
(74) *Attorney, Agent, or Firm* — Kinney & Lange, P.A.

(57) ABSTRACT

An optical beam steering device is disclosed which includes an optical component for interacting with an optical beam, a gimbal supporting the optical component, a roll cage supporting the gimbal, and a mount that houses and rotatably supports the roll cage. The roll cage and the mount include adjustment features allowing for both linear and angular adjustments of the gimbal and the roll cage.

20 Claims, 4 Drawing Sheets

RUGGEDIZED TWO-AXIS OPTICAL BEAM STEERING DEVICE

BACKGROUND

The present invention relates to mounts for positioning and aligning optics in a desired orientation. In particular, the present invention relates to a ruggedized optical beam steering/alignment device for use in military, commercial, and/or laboratory applications.

Most miniaturized optical assemblies utilize small "fast" (i.e. short focal length) lenses to minimize the overall size of the product. Using "fast" lenses increase the sensitivity to misalignment and to out of focus conditions, therefore requiring very precise and expensive mounting and adjustment features. Many beam steering systems require multiple optical mounts positioned at different angles in order to steer an optical beam from a source to a desired location. Thus, a significant amount of space and access in many directions is required to make adjustments to the beam steering components. These spatial issues become most problematic when the optical mounts are employed in applications such as aircraft that employ optical guidance, navigation, control, tracking systems, air data sensing, icing condition detection, water droplet size sensing, water content sensing and imaging, where the amount of space that is available to house the optical mount and ready access thereto is extremely limited.

Many off-the-shelf optical mounts are not designed to operate within or survive the harsh environments normally encountered in military applications involving aircraft and laser guided munitions. They often use light springs to hold components together, and can even require significant potting or epoxy for locking the components in place to prevent them from moving once adjusted. Further, some prior art optical mounts require separate fixtures to perform the angular adjustments, which results in more space necessary to adjust out of focus lenses and misalignments of the optical steering device.

There is clearly a need in the art for a ruggedized optical beam steering/alignment device that is easy to manufacture and construct, and that can be employed in the harsh environments often encountered in applications involving aircraft, missiles and projectiles, where the available space and ready access to the optical device is limited.

SUMMARY

An optical beam steering device includes an optical component for interacting with an optical beam, a gimbal supporting the optical component and defining a pan axis, a roll cage rotatably supporting the gimbal and defining a tilt axis that is orthogonal to the pan axis, and a mount that houses and rotatably supports the roll cage. The optical beam steering device further includes a first spring and a first threaded ring configured to secure the gimbal within the roll cage and a second spring and a second threaded ring configured to secure the roll cage within the mount.

DETAILED DESCRIPTION

Figure 1A:
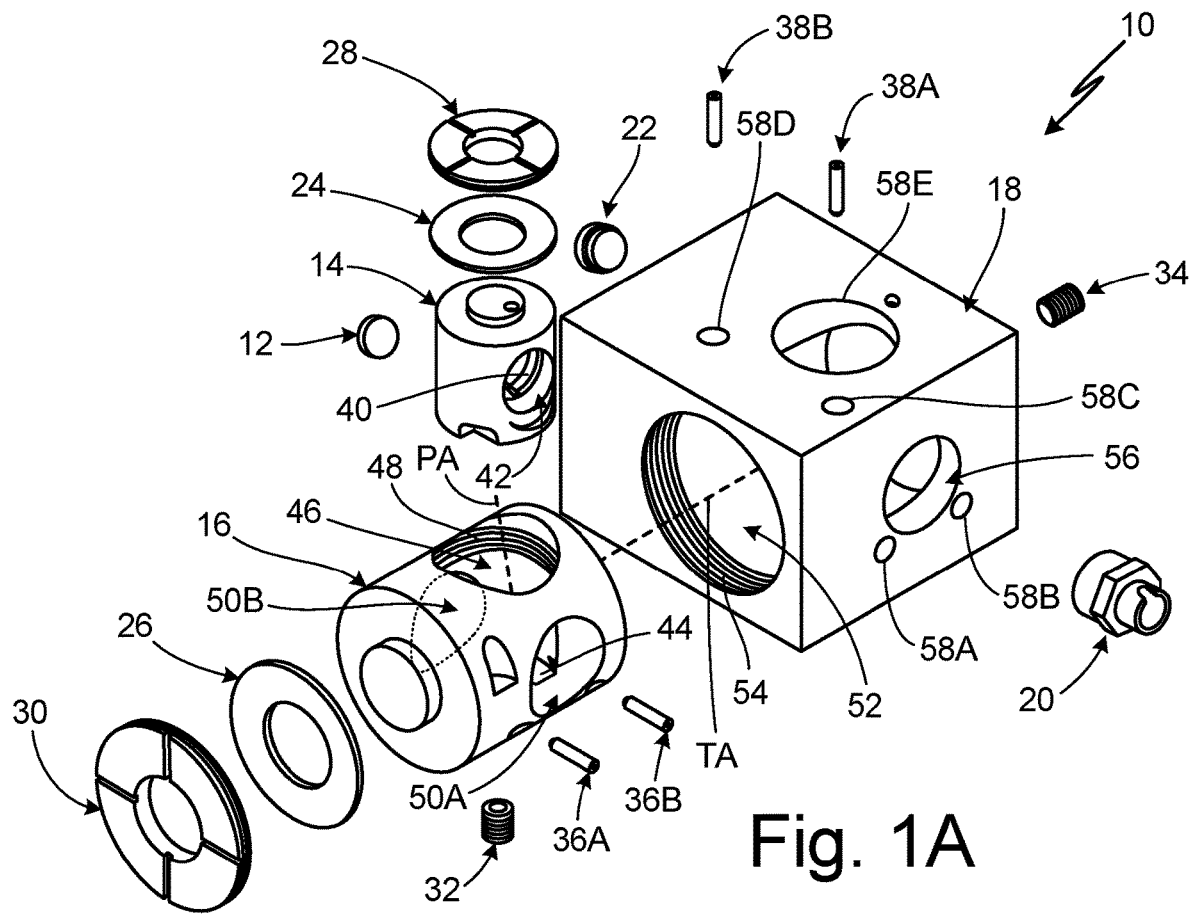
FIG. 1A is an exploded perspective view of an optical beam steering device.
Figure 1B:
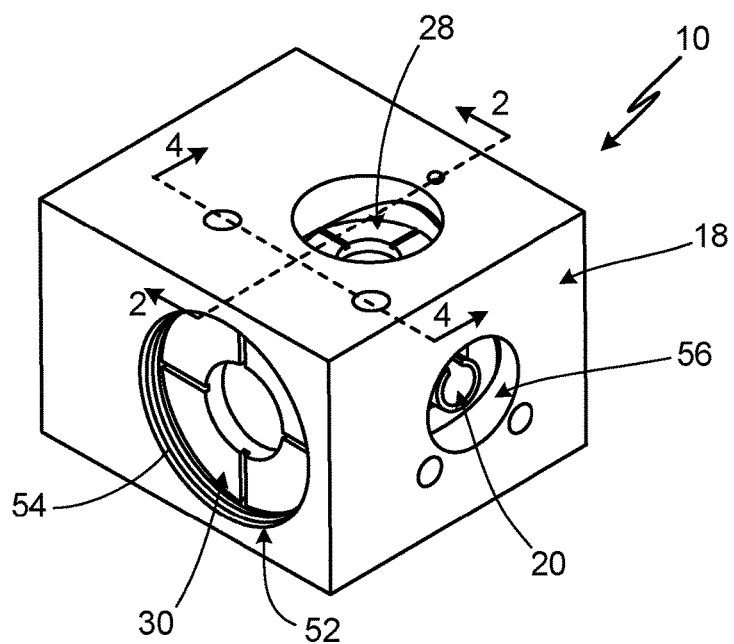
FIG. 1B is a perspective view of the optical beam steering device shown in FIG. 1A in an assembled form.

FIG. 1A is an exploded perspective view of optical beam steering device 10. FIG. 1B is a perspective view of optical beam steering device 10 in an assembled form. FIGS. 1A and 1B will be discussed together. Optical beam steering device 10 includes optical component 12, gimbal 14, roll cage 16, mount 18, fiber optic connector 20, and lens 22. Optical beam steering device 10 also includes first spring 24, second spring 26, first threaded ring 28, second threaded ring 30, first threaded insert 32, second threaded insert 34, first gimbal fastener 36A, second gimbal fastener 36B, first roll cage fastener 38A, and second roll cage fastener 38B. In the embodiment shown, optical beam steering device 10 includes fiber optic connector 20 for connecting optical fibers, optical component 12 for steering the light from the optical fibers, and lens 22 for focusing the steered light to a sensor (not shown). In other embodiments, optical beam steering device 10 could optionally include one or more of a laser, diode, or other light source that supplies light to optical beam steering device 10.

For ease of illustration, optical beam steering device 10 is shown in conjunction with a generic version of a mount 18 configured to operatively support optical beam steering device 10. It should be readily appreciated by those having ordinary skill in the art that an actual mounting structure or mount for optical beam steering device 10 would likely form part of a product body in an aircraft, missile or projectile, and would therefore conform with the system or componentry in which it is employed, for example, within a sensor body.

Optical beam steering device 10 includes optical component 12 for interacting with or otherwise directing an optical beam, such as a laser beam. Optical component 12 can take the form of a lens, optical mirror, metallic mirror, reflector, diffraction grating, band pass filter, color glass filter, wave plate, beam splitter, beam expander, window or the like. Optical component 12 of steering device 10 is supported within a generally cylindrical gimbal 14. More particularly, gimbal 14 includes gimbal seat 40 for receiving and supporting optical component 12. Gimbal seat 40 is accessed through aperture 42 in the side wall of gimbal 14. The position of optical component 12 is fixed within gimbal seat 40, so that the optical surface of optical component 12 is advantageously aligned with the center of rotation of gimbal 14 and passes through the center point of the optical surface, as explained in more detail below.

With continuing reference to FIGS. 1A and 1B, gimbal 14 is rotatably supported within a generally cylindrical roll cage 16. More particularly, roll cage 16 includes roll cage seat 44 for receiving and rotatably supporting gimbal 14. Roll cage seat 44 is accessed through bore 46 in the wall of roll cage 16. The center axis of bore 46 defines pan axis PA about which gimbal 14 rotates relative to roll cage 16. Thus when gimbal 14 is inserted within bore 46, the center axis of gimbal 14 also defines pan axis PA about which gimbal 14 rotates. In the embodiment shown, in which optical component 12 is a refractive type optic, the center of rotation of roll cage 16 preferably passes through the principal point of optical component 12. Moreover, the center of rotation of gimbal 14 and the center of rotation of roll cage 16 lie on the same geometric plane. This simplifies the scope of the adjustment to angular movements only, minimizing or otherwise eliminating translation of the beam during the adjustment process. In another embodiment, in which optical component 12 is a reflective type optic (such as a mirror), the center of rotation of roll cage 16 preferably passes through the center point of the optical surface of optical component 12.

First spring 24 and first threaded ring 28 are provided for fixing or otherwise locking the linear position of gimbal 14 relative to roll cage 16 by engaging the upper surface of gimbal 14 through bore 46 of roll cage 16. More particularly, first spring 24 is configured to provide resistance and compress against gimbal 14 when first threaded ring 28 is threaded into first mating threads 48 located on roll cage 16. First threaded insert 32 engages and supports the bottom surface of gimbal 14 and is configured to provide a means for linear adjustments to gimbal 14 within roll cage 16. First threaded insert 32 will be discussed in further detail below. When first spring 24 has been fully compressed and bottomed out using first threaded ring 28, gimbal 14 will be fully fixed or locked into position. In the embodiment shown, first spring 24 is a Belleville washer but in another embodiment first spring 24 can be any spring that provides resistance and limits movement of gimbal 14 within bore 46 of roll cage 16.

First gimbal fastener 36A and second gimbal fastener 36B extend through roll cage 16 and engage gimbal 14. First gimbal fastener 36A and second gimbal fastener 36B are configured to provide a means for angular adjustments to gimbal 14 within roll cage 16. First gimbal fastener 36A and second gimbal fastener 36B will be discussed in further detail below. Roll cage 16 also includes openings 50A and 50B to accommodate beam passage through roll cage 16 during use. Those skilled in the art will readily appreciate that the number and location of the openings in roll cage 16 can vary depending upon the application and the type of optical component 12 employed in steering device 10.

Roll cage 16 is rotatably supported within mount 18. More particularly, mount 18 includes bore 52 for receiving and rotatably supporting roll cage 16. The center axis of bore 52 defines tilt axis TA about which roll cage 16 rotates relative to mount 18. Second spring 26 and second threaded ring 30 are provided for fixing or otherwise locking the linear position of roll cage 16 relative to mount 18 by engaging a surface of roll cage 16 through bore 52 of mount 18. More particularly, second spring 26 is configured to provide resistance and compress against roll cage 16 when second threaded ring 30 is threaded into second mating threads 54 located on mount 18. Second threaded insert 34 engages and supports the surface of roll cage 16 opposite the surface engaged by second threaded ring 30. Second threaded insert 34 is configured to provide a means for linear adjustments to roll cage 16 within mount 18. Second threaded insert 34 will be discussed in further detail below. When second spring 26 has been fully compressed and bottomed out using second threaded ring 30, roll cage 16 will be fully fixed or locked into position. In the embodiment shown, second spring 26 is a Belleville washer but in another embodiment second spring 26 can be any spring that provides resistance and limits movement of roll cage 16 within bore 52 of mount 18.

First roll cage fastener 38A and second roll cage fastener 38B extend through mount 18 and engage roll cage 16. First roll cage fastener 38A and second roll cage fastener 38B are configured to provide a means for angular adjustments to roll cage 16 within mount 18. First roll cage fastener 38A and second roll cage fastener 38B will be discussed in further detail below. Mount 18 includes bore 52 and apertures 58A, 58B, 58C, 58D, 58E, and 58F and 58G (shown in FIG. 2) to allow access to first and second threaded rings 28 and 30, first and second threaded inserts 32 and 34, first and second gimbal fasteners 36A and 36B, and first and second roll cage fasteners 38A and 38B. As shown in FIG. 1B, apertures 58A-58G allow for both linear and angular adjustments of both gimbal 14 and roll cage 16, even when gimbal 14 and roll cage 16 are installed within mount 18.

Fiber optic connector 20 is positioned within aperture 42 of gimbal 14 and is configured to enable quick connection of optical fibers to optical beam steering device 10. Fiber optic connector 20 can be any fiber optic connector as generally known by one skilled in the art. Lens 22 is positioned within one of the plurality of apertures of mount 18 and opposite fiber optic connector 20. Lens 22 is configured to concentrate or disperse light rays, depending on the specific application. Lens 22 can be any lens as generally known by one skilled in the art. At least one side opening 56 is provided in mount 18 to accommodate beam passage through mount 18 during use. Moreover, depending upon the type of optical component employed, the mounting structure may need multiple openings or windows to accommodate the beam. For example, if the optical component is used for beam sampling, one opening will be needed for the input beam and two openings will be needed for two exit beams.

Figure 2:
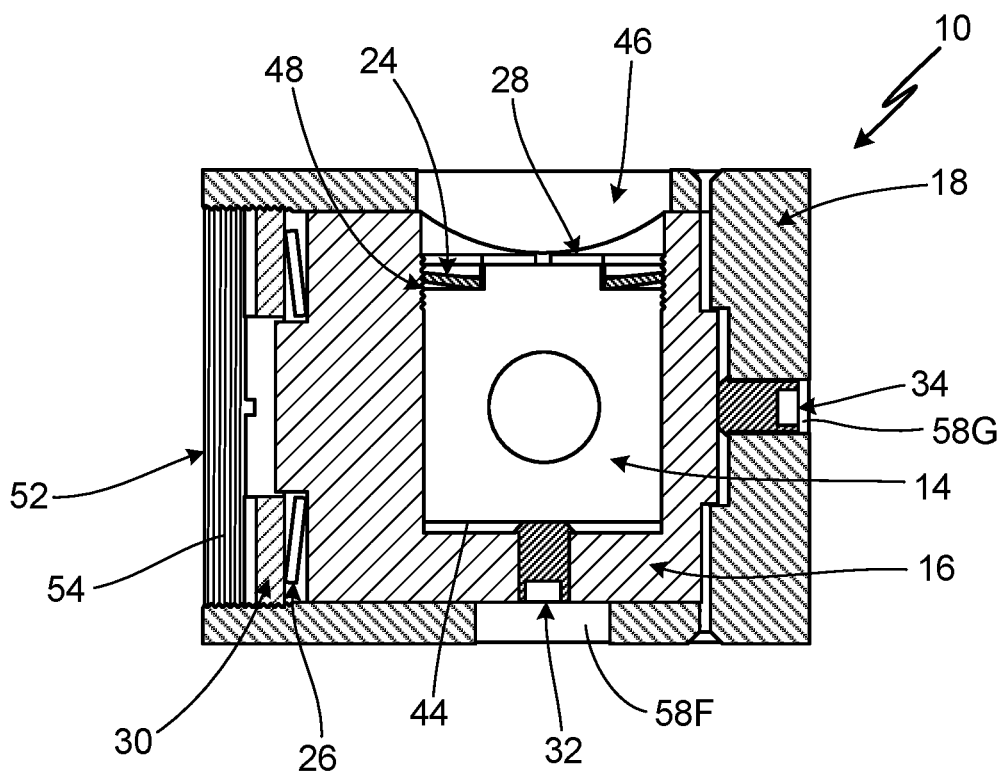
FIG. 2 is a cross-sectional view taken along line 2-2 of FIG. 1B, illustrating the linear adjustment features of the roll cage and the mount.

FIG. 2 is a cross-sectional view taken along line 2-2 of FIG. 1B, illustrating the linear adjustment features of optical beam steering device 10. As shown in FIG. 2, optical beam steering device 10 includes gimbal 14, roll cage 16, mount 18, first spring 24, second spring 26, first threaded ring 28, second threaded ring 30, first threaded insert 32, and second threaded insert 34. As discussed above, gimbal 14 is inserted through bore 46 into roll cage 16 and rotatably supported within roll cage seat 44. First threaded insert 32 extends through an aperture in roll cage 16 and engages a bottom surface of gimbal 14. First threaded insert 32 mates with corresponding threads in the aperture in roll cage 16 and is configured to translate in a linear direction when threaded in or out of the aperture in roll cage 16. The linear translation of first threaded insert 32 results in gimbal 14 translating in the same linear direction. First spring 24 provides resistance and compresses against a top surface of gimbal 14 when first threaded ring 28 is threaded into first mating threads 48 located on roll cage 16. The compressive force exerted by first spring 24 prevents large movements of gimbal 14 when the linear or angular orientation of gimbal 14 is being adjusted.

To translate gimbal 14 linearly downward, in the orientation shown, first threaded insert 32 is threaded outward resulting in first threaded insert 32 backing out of the aperture in roll cage 16. As a result of the compressive force from first spring 24, gimbal 14 will translate linearly downward with first threaded insert 32. First threaded ring 28 is then threaded downward to fully compress and bottom out first spring 24, resulting in gimbal 14 being fully fixed or locked into position. To translate gimbal 14 linearly upward, in the orientation shown, first threaded ring 28 is threaded outward resulting in first threaded ring 28 backing out of first mating threads 48 in roll cage 16. As a result, the compressive force exerted on the top surface of gimbal 14 will lessen and first spring 24 will no longer be bottomed out. First threaded insert 32 can then be threaded upward, causing gimbal 14 to translate linearly upward with first threaded insert 32. First threaded insert 32 will be threaded upward until first spring 24 is fully compressed and bottomed out, resulting in gimbal 14 being fully fixed or locked into position.

With continuing reference to FIG. 2, roll cage 16 is inserted through and rotatably supported by bore 52 of mount 18. Second threaded insert 34 extends through aperture 58G in mount 18 and engages a surface of roll cage 16. Second threaded insert 34 mates with corresponding threads in aperture 58G in mount 18 and is configured to translate in a linear direction perpendicular to the linear direction first threaded insert 32 translates. The linear translation of second threaded insert 34 causes roll cage 16 to translate in the same linear direction. Second spring 26 provides resistance and compresses against a surface of roll cage 16, opposite second threaded insert 34, when second threaded ring 30 is threaded into second mating threads 54 located on mount 18. The compressive force exerted by second spring 26 prevents large movements of roll cage 16 when the linear or angular orientation of roll cage 16 is being adjusted.

To translate roll cage 16 right, in the orientation shown, second threaded insert 34 is threaded outward resulting in second threaded insert 34 backing out of aperture 58G in mount 18. As a result of the compressive force from second spring 26, roll cage 16 will translate linearly with second threaded insert 34. Second threaded ring 30 is then threaded inward to fully compress and bottom out second spring 26, resulting in roll cage 16 being fully fixed or locked into position. To translate roll cage 16 left, in the orientation shown, second threaded ring 30 is threaded outward resulting in second threaded ring 30 backing out of second mating threads 54 in mount 18. As a result, the compressive force exerted on the surface of roll cage 16 will lessen and second spring 26 will no longer be bottomed out. Second threaded insert 34 can then be threaded inward, causing roll cage 16 to translate linearly with second threaded insert 34. Second threaded insert 34 will be threaded inward until second spring 26 is fully compressed and bottomed out, resulting in roll cage 16 being fully fixed or locked into position.

Figure 3:
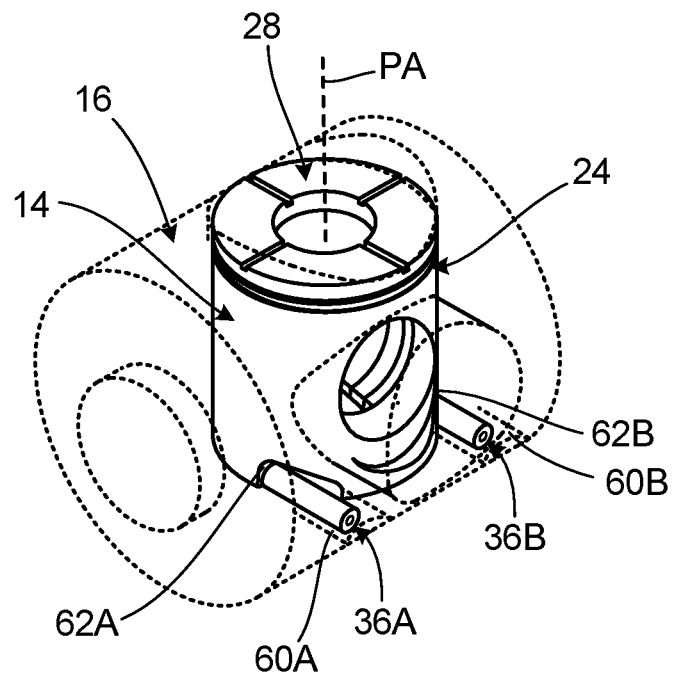
FIG. 3 is a perspective view of the gimbal assembled in the roll cage, illustrating the angular adjustments of the gimbal.

FIG. 3 is a perspective view of gimbal 14 assembled in roll cage 16, illustrating how to perform the angular adjustments of gimbal 14 within roll cage 16. FIG. 3 includes gimbal 14, roll cage 16, first spring 24, first threaded ring 28, first gimbal fastener 36A, second gimbal fastener 36B, apertures 60A and 60B, first notch and shoulder 62A, and second notch and shoulder 62B. To perform angular adjustments of gimbal 14 about pan axis PA, first threaded ring 28 must be slightly unthreaded from first mating threads 48 (shown in FIG. 2) of roll cage 16. Unthreading first threaded ring 28 from first mating threads 48 lowers the compressive force exerted by first spring 24 on the top surface of gimbal 14. With the compressive force lowered, gimbal 14 has less friction and is capable of rotation about pan axis PA by utilizing first gimbal fastener 36A and second gimbal fastener 36B.

First and second gimbal fasteners 36A and 36B are inserted through and secured to apertures 60A and 60B, respectively, in the wall of roll cage 16. In the embodiment shown, first and second gimbal fasteners 36A and 36B are threaded set screws. Thus, first and second gimbal fasteners 36A and 36B are threaded into corresponding threads in apertures 60A and 60B in the wall of roll cage 16. To rotate gimbal 14 clockwise, second gimbal fastener 36B is threaded outward from aperture 60B in the wall of roll cage 16. Then first gimbal fastener 36A is threaded inward into aperture 60A in the wall of roll cage 16. The inward threading of first gimbal fastener 36A causes a force to be exerted on first notch and shoulder 62A of gimbal 14, which then rotates gimbal 14 clockwise about pan axis PA. Gimbal 14 continues to rotate clockwise about pan axis PA until it reaches the desired angular position. Then second gimbal fastener 36B is threaded inward into aperture 60B until second gimbal fastener 36B contacts and is pressed against second notch and shoulder 62B of gimbal 14. When both first gimbal fastener 36A and second gimbal fastener 36B are pressed against first notch and shoulder 62A and second notch and shoulder 62B, respectively, the angular position of gimbal 14 will be locked in position. Once gimbal 14 is locked in the desired angular position, first threaded ring 28 is threaded inward causing first spring 24 to compress and bottom out. Resulting in gimbal 14 being fully fixed or locked into position. First and second gimbal fasteners 36A and 36B must be threaded in opposite directions to cause gimbal 14 to rotate about pan axis PA. First and second gimbal fasteners 36A and 36B allow for precise adjustments to the angular position of gimbal 14 within roll cage 16.

Figure 4A:
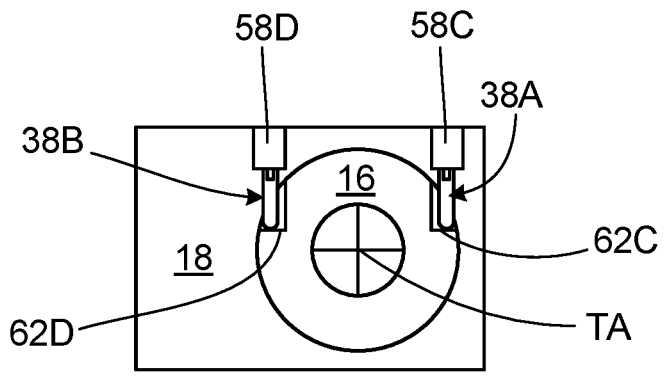
FIG. 4A is a cross-sectional view taken along line 4-4 of FIG. 1B, illustrating the roll cage in a non-rotated position.
Figure 4B:
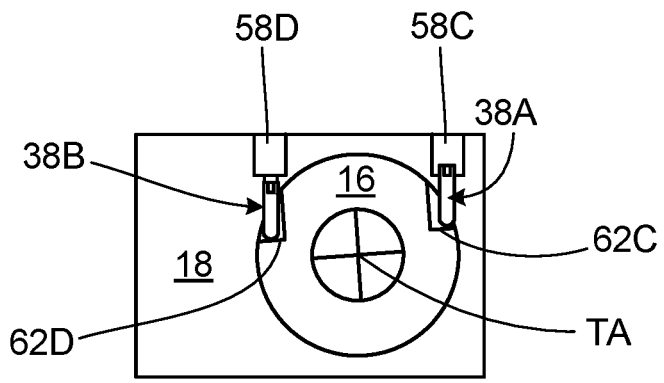
FIG. 4B is a cross-sectional view taken along line 4-4 of FIG. 1B, illustrating the roll cage rotated counterclockwise.
Figure 4C:
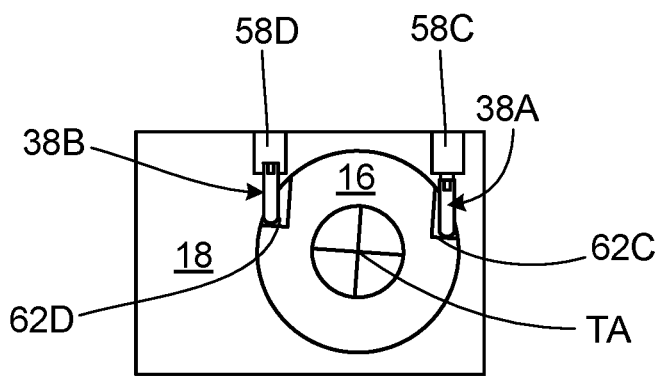
FIG. 4C is a cross-sectional view taken along line 4-4 of FIG. 1B, illustrating the roll cage rotated clockwise.

FIG. 4A is a cross-sectional view taken along line 4-4 of FIG. 1B, illustrating roll cage 16 in a non-rotated position. FIG. 4B is a cross-sectional view taken along line 4-4 of FIG. 1B, illustrating roll cage 16 rotated counterclockwise. FIG. 4C is a cross-sectional view taken along line 4-4 of FIG. 1B, illustrating roll cage 16 rotated clockwise. FIGS. 4A-4C will be discussed together. FIGS. 4A-4C include roll cage 16, mount 18, first roll cage fastener 38A, second roll cage fastener 38B, apertures 58C and 58D, third notch and shoulder 62C, and fourth notch and shoulder 62D. To perform angular adjustments of roll cage 16 about tilt axis TA, second threaded ring 30 (shown in FIGS. 1A and 2) must first be slightly unthreaded from second mating threads 54 of mount 18 (shown in FIGS. 1A and 2). Unthreading second threaded ring 30 from second mating threads 54 lowers the compressive force exerted by second spring 26 on roll cage 16. With the compressive force lowered, roll cage 16 has less friction and is capable of rotation about tilt axis TA by utilizing first roll cage fastener 38A and second roll cage fastener 38B.

First and second roll cage fasteners 38A and 38B are inserted through and secured to apertures 58C and 58D, respectively, in the wall of mount 18. In the embodiment shown, first and second roll cage fasteners 38A and 38B are threaded set screws. Thus, first and second roll cage fasteners 38A and 38B are threaded into corresponding threads in apertures 58C and 58D in the wall of mount 18. In FIG. 4A, first and second roll cage fasteners 38A and 38B are threaded into mount 18 equally, therefore roll cage 16 is in a non-rotated position.

As shown in FIG. 4B, to rotate roll cage 16 counterclockwise first roll cage fastener 38A is threaded outward from aperture 58C in the wall of mount 18. Then second roll cage fastener 38B is threaded inward into aperture 58D in the wall of mount 18. The inward threading of second roll cage fastener 38B causes a force to be exerted on fourth notch and shoulder 62D of roll cage 16, which then rotates roll cage 16 counterclockwise about tilt axis TA. Roll cage 16 continues to rotate counterclockwise about tilt axis TA until it reaches the desired angular position. Then first roll cage fastener 38A is threaded inward into aperture 58C until first roll cage fastener 38A contacts and is pressed against third notch and shoulder 62C of roll cage 16. When both first roll cage fastener 38A and second roll cage fastener 38B are pressed against third notch and shoulder 62C and fourth notch and shoulder 62D, respectively, the angular position of roll cage 16 will be locked in position. Once roll cage 16 is locked in the desired angular position, second threaded ring 30 (shown in FIGS. 1A and 2) is threaded inward causing second spring 26 to compress and bottom out. Resulting in roll cage 16 being fully fixed or locked into position.

As shown in FIG. 4C, to rotate roll cage 16 clockwise second roll cage fastener 38B is threaded outward from aperture 58D in the wall of mount 18. Then first roll cage fastener 38A is threaded inward into aperture 58C in the wall of mount 18. The inward threading of first roll cage fastener 38A causes a force to be exerted on third notch and shoulder 62C of roll cage 16, which then rotates roll cage 16 clockwise about tilt axis TA. Roll cage 16 continues to rotate clockwise about tilt axis TA until it reaches the desired angular position. Then second roll cage fastener 38B is threaded inward into aperture 58D until second roll cage fastener 38B contacts and is pressed against fourth notch and should 62D of roll cage 16. When both first roll cage fastener 38A and second roll cage fastener 38B are pressed against third notch and shoulder 62C and fourth notch and shoulder 62D, respectively, the angular position of roll cage 16 will be locked in position. Once roll cage 16 is locked in the desired angular position, second threaded ring 30 (shown in FIGS. 1A and 2) is threaded inward causing second spring 26 to compress and bottom out. Resulting in roll cage 16 being fully fixed or locked into position.

First and second roll cage fasteners 38A and 38B must be threaded in opposite directions to cause roll cage 16 to rotate about tilt axis TA. First and second roll cage fasteners 38A and 38B allow for precise adjustments to the angular position of roll cage 16 within mount 18.

Figure 5A:
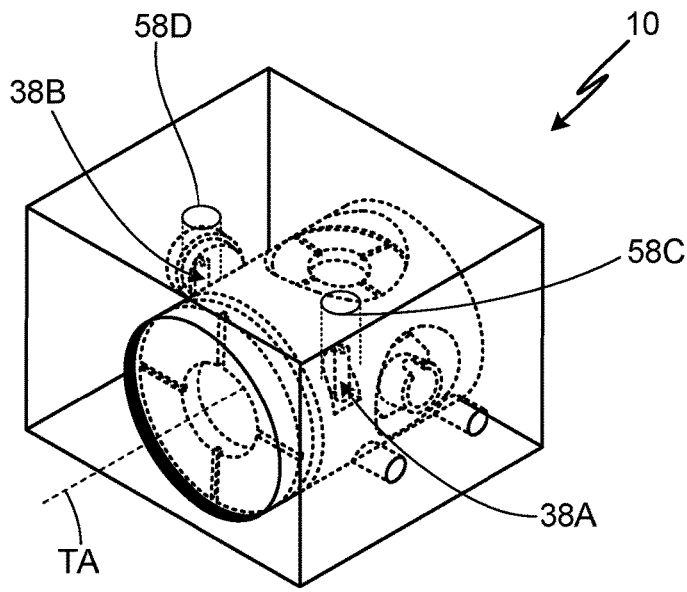
FIG. 5A is a perspective view of a first embodiment of the optical beam steering device, showing the adjustment features in a first location.
Figure 5B:
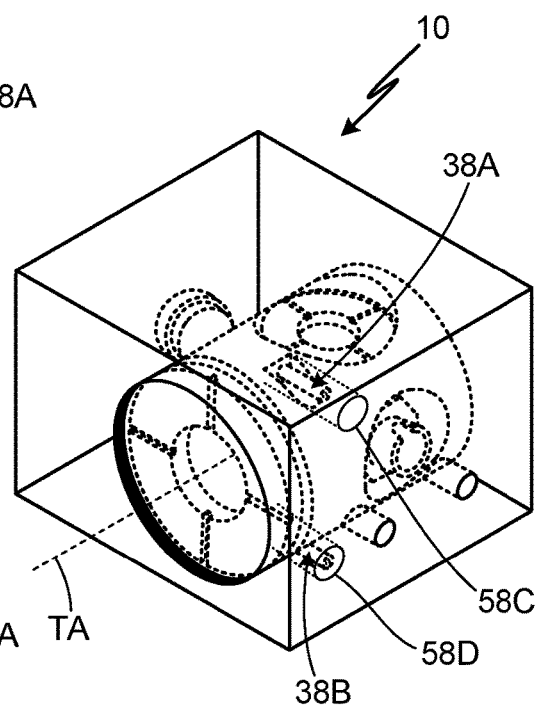
FIG. 5B is a perspective view of a second embodiment of the optical beam steering device, showing the adjustment features in a second location.
Figure 5C:
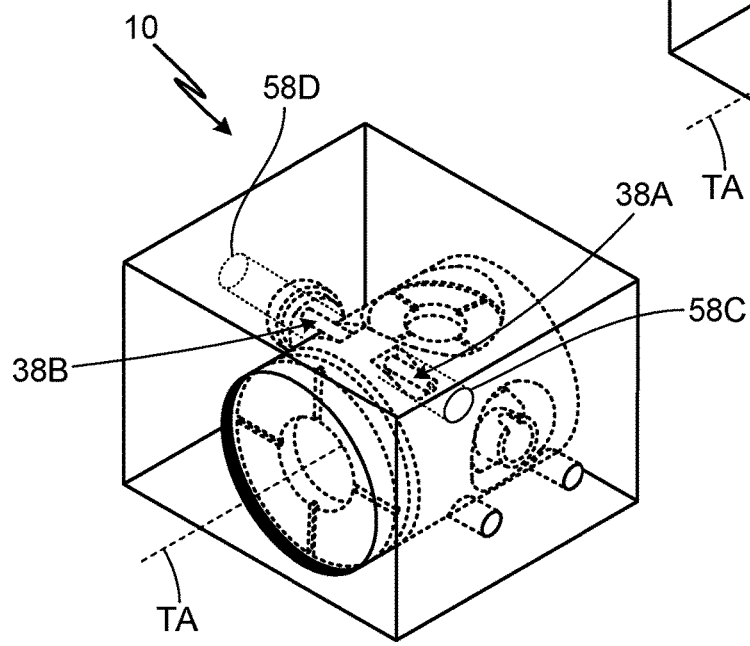
FIG. 5C is a perspective view of a third embodiment of the optical beam steering device, showing the adjustment features in a third location.

FIG. 5A is a perspective view of a first embodiment of optical beam steering device 10, showing the roll cage adjustment features in a first location. FIG. 5B is a perspective view of a second embodiment of optical beam steering device 10, showing the roll cage adjustment features in a second location. FIG. 5C is a perspective view of a third embodiment of optical beam steering device 10, showing the roll cage adjustment features in a third location. FIGS. 5A-5C will be discussed together. In the following, roll cage adjustment features is referring to first roll cage fastener 38A, second roll cage fastener 38B, and apertures 58C and 58D which first and second roll cage fasteners 38A and 38B are threaded into, respectively.

FIGS. 5A-5C show three different embodiments of optical beam steering device 10 in which the roll cage adjustment features are located in different positions on mount 18. In FIG. 5A, the roll cage adjustment features are positioned on a first surface (top surface) of mount 18. FIG. 5A is the embodiment that has been discussed throughout this description. In FIG. 5B, the roll cage adjustment features are positioned on a second surface (side surface) of mount 18. In FIG. 5C, the roll cage adjustment features are positioned on opposite sides of mount 18. FIGS. 5A-5C represent only a few embodiments of optical beam steering device 10, the roll cage adjustment features can be located in a plurality of other locations not shown in the present embodiments.

Further, the gimbal adjustment features (first gimbal fastener 36A and second gimbal fastener 36B) can also be positioned in a plurality of locations, depending on the specific application and the available access to device 10 when installed in a system.

But in all embodiments, first and second roll cage fasteners 38A and 38B must be threaded in opposite directions to cause roll cage 16 to rotate about tilt axis TA. In other words, if first roll cage fastener 38A is threaded outward, then second roll cage fastener 38B must be threaded inward to cause roll cage 16 to rotate about tilt axis TA. First and second roll cage fasteners 38A and 38B allow for precise adjustments to the angular position of roll cage 16 within mount 18.

Optical beam steering device 10 provides several benefits over previous optical beam steering devices. Optical beam steering device 10 eliminates a separate fixture needed to perform angular adjustments of pan axis PA and tilt axis TA by including the adjustment features directly into the main component. Optical beam steering device 10 adds two linear adjustment features to allow for linear alignment of optical component 12, increasing the degrees of freedom of the device. Optical beam steering device 10 is also simpler and easier to machine and manufacture, thus reducing the cost of the machined parts.

DISCUSSION OF POSSIBLE EMBODIMENTS

The following are non-exclusive descriptions of possible embodiments of the present invention.

An optical beam steering device includes an optical component for interacting with an optical beam, a gimbal supporting the optical component and defining a pan axis, a roll cage rotatably supporting the gimbal and defining a tilt axis that is orthogonal to the pan axis, and a mount that houses and rotatably supports the roll cage. The optical beam steering device further includes a first spring and a first threaded ring configured to secure the gimbal within the roll cage and a second spring and a second threaded ring configured to secure the roll cage within the mount.

The optical beam steering device of the preceding paragraph can optionally include, additionally and/or alternatively, any one or more of the following features, configurations and/or additional components:

A first gimbal fastener and a second gimbal fastener configured to rotate the gimbal about the pan axis.

The first gimbal fastener and the second gimbal fastener extend through and are attached to the roll cage.

A first roll cage fastener and a second roll cage fastener configured to rotate the roll cage about the tilt axis.

The first roll cage fastener and the second roll cage fastener extend through and are attached to the mount.

A first threaded insert configured to translate the gimbal in a first direction.

The first threaded insert extends through and is attached to the roll cage.

A second threaded insert configured to translate the roll cage in a second direction.

The second direction is orthogonal to the first direction.

The second threaded insert extends through and is attached to the mount.

The first spring is positioned between the gimbal and the first threaded ring.

The second spring is positioned between the roll cage and the second threaded ring.

The roll cage includes an opening for receiving the gimbal.

The roll cage includes an interior seat for accommodating the gimbal.

The gimbal includes an interior seat for accommodating the optical component.

The gimbal interior seat is adapted and configured so that the center of an optical surface of the optical component seated therein is aligned with the pan axis of the gimbal.

The roll cage interior seat is adapted and configured so that the pan axis of the gimbal is in the same plane as the tilt axis of the roll cage.

The mount includes an opening for receiving the roll cage.

A fiber optic connector and a lens.

The optical component is selected from the group consisting of a window, a lens, a mirror, a filter, a beam splitter, a beam sampler, and a beam expander.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An optical beam steering device, comprising:
   an optical component for interacting with an optical beam;
   a gimbal supporting the optical component and defining a pan axis;
   a roll cage rotatably supporting the gimbal and defining a tilt axis, wherein the tilt axis is orthogonal to the pan axis;
   a mount that houses and rotatably supports the roll cage;
   a first spring and a first threaded ring configured to secure the gimbal within the roll cage; and
   a second spring and a second threaded ring configured to secure the roll cage within the mount.

2. The optical beam steering device of claim 1, further comprising a first gimbal fastener and a second gimbal fastener configured to rotate the gimbal about the pan axis.

3. The optical beam steering device of claim 2, wherein the first gimbal fastener and the second gimbal fastener extend through and are attached to the roll cage.

4. The optical beam steering device of claim 1, further comprising a first roll cage fastener and a second roll cage fastener configured to rotate the roll cage about the tilt axis.

5. The optical beam steering device of claim 4, wherein the first roll cage fastener and the second roll cage fastener extend through and are attached to the mount.

6. The optical beam steering device of claim 1, further comprising a first threaded insert configured to translate the gimbal in a first direction.

7. The optical beam steering device of claim 6, wherein the first threaded insert extends through and is attached to the roll cage.

8. The optical beam steering device of claim 6, further comprising a second threaded insert configured to translate the roll cage in a second direction.

9. The optical beam steering device of claim 8, wherein the second direction is orthogonal to the first direction.

10. The optical beam steering device of claim 8, wherein the second threaded insert extends through and is attached to the mount.

11. The optical beam steering device of claim 1, wherein the first spring is positioned between the gimbal and the first threaded ring.

12. The optical beam steering device of claim 1, wherein the second spring is positioned between the roll cage and the second threaded ring.

13. The optical beam steering device of claim 1, wherein the roll cage includes an opening for receiving the gimbal.

14. The optical beam steering device of claim 1, wherein the roll cage includes an interior seat for accommodating the gimbal.

15. The optical beam steering device of claim 1, wherein the gimbal includes an interior seat for accommodating the optical component.

16. The optical beam steering device of claim 15, wherein the interior seat is adapted and configured so that the center of an optical surface of the optical component seated therein is aligned with the pan axis of the gimbal.

17. The optical beam steering device of claim 15, wherein the interior seat is adapted and configured so that the pan axis of the gimbal is in a same plane as the tilt axis of the roll cage.

18. The optical beam steering device of claim 1, wherein the mount includes an opening for receiving the roll cage.

19. The optical beam steering device of claim 1, further comprising a fiber optic connector and a lens.

20. The optical beam steering device of claim 1, wherein the optical component is selected from the group consisting of a window, a lens, a mirror, a filter, a beam splitter, a beam sampler, and a beam expander.

* * * * *